(12) United States Patent
Gounares et al.

(10) Patent No.: US 8,239,293 B2
(45) Date of Patent: Aug. 7, 2012

(54) COMPUTER SYSTEM AND METHOD FOR BULK AUDITING, ARCHIVING, AND SELLING PERSONAL PROPERTY OF A CUSTOMER

(75) Inventors: Alexander Gounares, Kirkland, WA (US); David M. Chickering, Bellevue, WA (US); Eric J. Horvitz, Kirkland, WA (US); Michael Connolly, Seattle, WA (US); Lili Cheng, Bellevue, WA (US); Kamal Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 11/960,105

(22) Filed: Dec. 19, 2007

(65) Prior Publication Data

US 2008/0154917 A1   Jun. 26, 2008

Related U.S. Application Data

(60) Provisional application No. 60/870,926, filed on Dec. 20, 2006.

(51) Int. Cl.
*G06Q 10/00* (2012.01)

(52) U.S. Cl. ....... 705/28; 705/26.1; 705/27.1; 705/27.2; 707/949

(58) Field of Classification Search ................... 705/28; 707/949
See application file for complete search history.

(56) References Cited

U.S. PATENT DOCUMENTS

| | | | | |
|---|---|---|---|---|
| 7,551,849 | B1* | 6/2009 | Abad | 396/310 |
| 7,725,477 | B2* | 5/2010 | Wiseman | 707/758 |
| 2001/0025245 | A1* | 9/2001 | Flickinger et al. | 705/1 |
| 2002/0032626 | A1* | 3/2002 | DeWolf et al. | 705/35 |
| 2002/0065825 | A1* | 5/2002 | Kassan et al. | 707/9 |
| 2002/0123937 | A1* | 9/2002 | Pickover et al. | 705/26 |
| 2003/0130952 | A1* | 7/2003 | Bell et al. | 705/51 |
| 2004/0158502 | A1* | 8/2004 | Adams et al. | 705/26 |
| 2005/0197909 | A1* | 9/2005 | Klenske | 705/26 |
| 2005/0278204 | A1* | 12/2005 | Weinberg et al. | 705/7 |
| 2006/0015451 | A1* | 1/2006 | Heyer | 705/39 |
| 2006/0069611 | A1* | 3/2006 | Litt et al. | 705/14 |
| 2006/0106652 | A1* | 5/2006 | Wamsley | 705/4 |
| 2006/0218047 | A1* | 9/2006 | Mack et al. | 705/26 |
| 2007/0143123 | A1* | 6/2007 | Goldberg et al. | 705/1 |
| 2008/0033847 | A1* | 2/2008 | McIntosh | 705/28 |
| 2008/0065514 | A1* | 3/2008 | Eaton | 705/27 |
| 2009/0012878 | A1* | 1/2009 | Tedesco et al. | 705/27 |

OTHER PUBLICATIONS

Mary Beth Breckenridge. (Jan. 30, 2006). Inventory helps in disaster. McClatchey Tribune News Service,1. Retrieved Mar. 25, 2012, from ProQuest Newsstand. (Document ID: 978336761).*

Debra Smith. (Jan. 30, 2005). Into the fire : A house fire can be even more devastating when insurance doesn't cover all the losses. The Herald. Retrieved Mar. 25, 2012, from ProQuest Newsstand. (Document ID: 1445683521).*

* cited by examiner

*Primary Examiner* — Scott Zare

(74) *Attorney, Agent, or Firm* — Shook, Hardy & Bacon L.L.P.

(57) ABSTRACT

The claimed subject matter relates to an architecture that can facilitate auditing of a customer's possessions in a comprehensive manner. The architecture can facilitate the creation of a media archive of a customer's property, as well as an associated property list extracted based upon, e.g., examination of the archive. The property list can include an entry associated with an item of property and can be transmitted to subsidizing entities to offset the expenses associated with the creation of the archive and the property list.

20 Claims, 11 Drawing Sheets

COMPUTER SYSTEM AND METHOD FOR BULK AUDITING, ARCHIVING, AND SELLING PERSONAL PROPERTY OF A CUSTOMER

CROSS-REFERENCE TO RELATED APPLICATIONS

This application claims the benefit of U.S. Provisional Application Ser. No. 60/870,926, filed Dec. 20, 2006, entitled "ARCHITECTURES FOR SEARCH AND ADVERTISING." The entirety of this application is incorporated herein by reference.

BACKGROUND

Typical households steadily collect items of personal property that, after some time, maintain only a marginal amount of utility to the owner or owners. While many of these items of personal property could be sold to others, most individuals do not take advantage of this alternative because it is often felt it is too troublesome to hold a conventional yard sale or post items to one or several sales or auction websites that exist today. Often, the owner genuinely does not have the time to do so. As a last resort, the owner might even donate the property to a charity such as Goodwill or the Salvation Army or another organization. Even when such organizations have local centers or are willing to come on-site to the owner's property, many owners find even this is still too troublesome to bother with.

As a result the property is thrown out, which creates waste, or, alternatively the property simply collects dust and occupies space, which is similarly inefficient in terms of utility to the owner. However, it is known that better uses could be made of such property, and in many cases there is a market for customary household items, yet additional incentives appear to be necessary to encourage the owner to make productive use of the items in the form of sale or some other method of exchange.

Given that advertisers direct a substantial amount of money to typical households (today, this figure is about 3,000 USD per household), there is money that could be readily available for the abovementioned incentive, yet, today, this resource is not adequately utilized.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can facilitate comprehensive auditing of a customer's possessions, which can be examined, itemized, or catalogued in an efficient manner to facilitate an exchange. In accordance therewith and other related ends, the architecture can receive and store a media archive such as photographs or video of property associate with a customer. Likewise, the architecture can also receive and store a property list that includes an entry for an item included in the customer's property.

According to an aspect of the claimed subject matter, the architecture can transmit the entity to a disparate resale or charity system or component such as a website devoted to auctions or charity contributions. Such can be achieved based upon permissions set by the customer, or in another aspect based upon a location (e.g., data included in the entry) of the item. For example, a television might be automatically tagged for exchange if it is stored in the garage, but not if it is located in the living room.

The architecture can also facilitate outsourcing for the generation of one or both of the archive and the property list. For example the architecture can certify or approve of a specialist or agent to visit the property and conduct a comprehensive media archival of the property, which can later be used to generate the property list, by an approved cataloger or in other ways described herein. Both cases can lead to an expense to the customer, however, this expense can be offset or subsidized by subsidizing entities such as common insurance agencies, real estate brokers or advertisers, who might share certain common interests the data collected.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
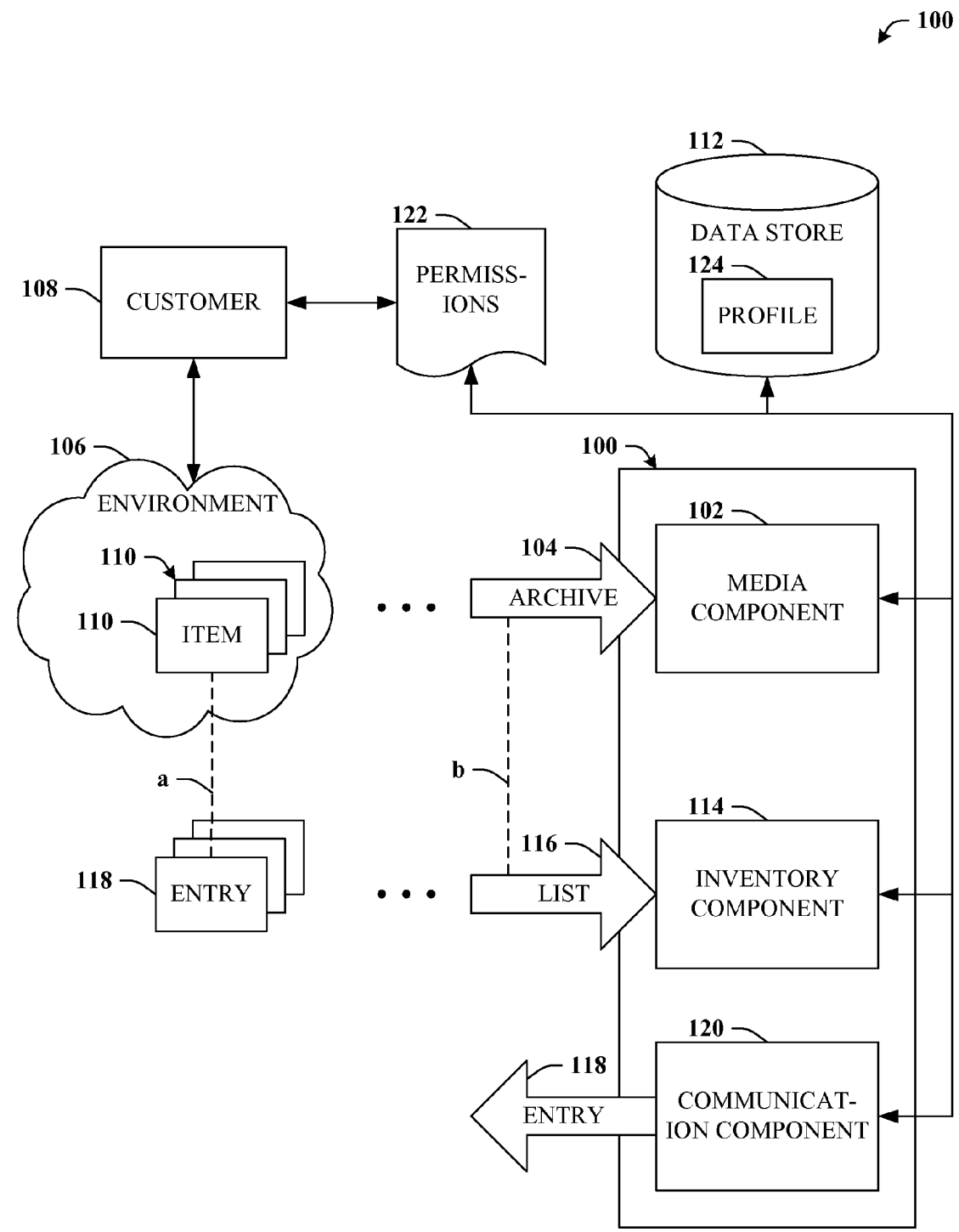
FIG. 1 illustrates a block diagram of a system that can facilitate comprehensive auditing of a customer's possessions.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, system 100 that can facilitate comprehensive auditing of a customer's possessions is depicted. Generally, system 100 can include media component 102 that can receive and store media archive 104. According to an aspect of the claimed subject matter, media archive 104 can be comprised of, e.g., one or more images, a video, or a combination thereof. The images or video included in media archive 104 can depict environment 106 of customer 108 from multiple views. For example, environment 106 can be real property associated with customer 108 such as a residence (e.g., apartment, condominium, apartment . . . ) or even a garage, attic, storage shed, warehouse, or the like. Typically, environment 106 is intended to include interior spaces, thus, archive 104 can include, or be expressly aimed at capturing, photographical or digital representations of set $110_S$ of personal property items. Media component 102 can store archive 104 to data store 112. Data store 112 is intended to be a repository of all or portions of data, data sets, or information described herein or otherwise suitable. Data store 112 can be centralized or distributed, potentially across multiple devices and/or schemas.

By way of illustration, but not necessarily meant to limit the appended claims to only the following examples, archive 104 can be video footage of a residence that includes a 360-degree pan of one or more rooms within the residence, a compilation of images of the same, and so forth, and can include video or images at multiple levels of zoom that can facilitate capture relevant features or aspects (e.g., one or more items 110 from set $110_S$) included in environment 106, or details thereof.

System 100 can also include inventory component 114 that can receive property list 116, wherein property list 116 can include entry 118 for item 110 from set $110_S$ of personal property items. Hence, entry 118 can be, e.g., a computer readable record or other data structure stored in a computer readable medium that corresponds to item 110 physically situated within environment 106 and/or electronically or digitally represented by archive 104. Thus, each item 110 within environment 106 can (but need not in all cases) be associated with entry 118, as illustrated by the broken line at reference label "a." In accordance therewith, list 116 can include one or more entries 118, each of can be associated with a respective item 110 included in archive 104, which is likewise represented by the dashed line at reference label "b." As with archive 104, both list 116 or entry 118 can be saved to data store 112.

Although not expressly depicted, it should be appreciated that property list 116 can include real property as well, thus a suitable entry can exist in connection with environment 106 that is analogous to the relationship between entry 118 and item 110 as described herein. Before continuing with the discussion of FIG. 1, entry 118 can be examined in more detail with reference to FIG. 2.

Figure 2:
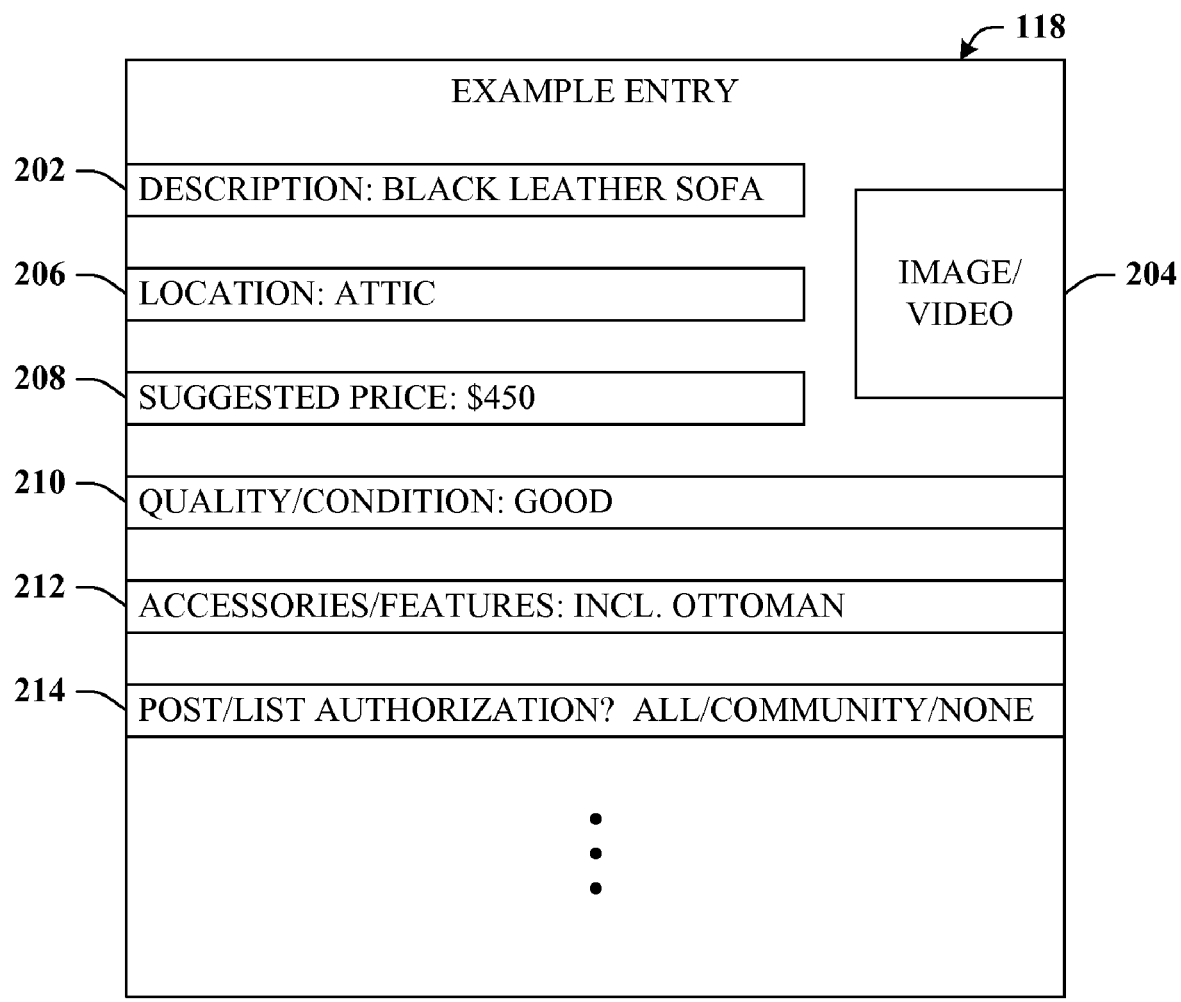
FIG. 2 illustrates a block diagram of an example of the data structure that comprises entry 118.

While still referencing FIG. 1, but turning simultaneously to FIG. 2, an example of the data structure that comprises entry 118 is illustrated. Although example entry 118 depicts a number of exemplary elements (e.g., 202-214), it should be appreciated that such elements are not intended to be a complete recitation of all that can exist in entry 118. Rather, it is readily apparent that entry 118 can include numerous other data sets, types, hierarchies, relationships, etc. without departing from the scope or spirit of the claimed subject matter. Moreover, it should also be understood that information included in example entity 118 need not necessarily be represented as discreet fields commonly associated with relational models or schema.

According to an aspect of the claimed subject matter, entry 118 can include description 202 of item 110. For example, consider archive 104 that depicts a residence of customer 108. Included in this residence is, inter alia, a sofa (e.g., item 110), which description 202 denotes as "Black Leather Sofa." In addition, example entry 118 includes media 204, which can be one or more images of item 110, a video of item 110, etc. Another element of entry 118 can be location 206. As depicted, location 206 can relate to a particular room or region (here "Attic") of environment 106, a street address (e.g., in the case where property list 116 includes real property) of environment, coordinates, or some other aspect of position, potentially including a position within archive 104 or media 204 described by, e.g., metadata.

While not, of course, strictly necessary, example entry 118 can include much additional information such as suggested price 208, a condition or quality 210 of item 110, options, features or accessories 212, as well as an indication as to whether or not entry 118 there is authorization 214 for sharing, posting, and/or listing entry 118 to, say, a third party platform. Appreciably, this additional information as well as other aspects of entry 118 can follow a schema defined by the creator of property list 116, which is further detailed in connection with FIG. 5. Moreover, in the case of authorization 214, it should be appreciated that such can be populated automatically, and can be based upon permissions 122, described infra.

While still referring to FIG. 1, system 100 can also include communication component 120 that can transmit entry 118 for display potentially based upon permissions 122. For example, customer 108 can potentially define the types of information and/or entries 118 that can be shared as well as with whom this information is to be shared, which can be set based upon permissions 122.

Although not expressly depicted so, permissions 122 can be included in data store 112 along with or included within profile 124. Profile 124 can include a variety of information relating to customer 108, such as that which is expressly described herein as well as other information suitable for or within the spirit of the claimed subject matter. For example, profile 124 can include one or more transaction histories that can relate to substantially any type of consumer transaction such as purchases (e.g., products, services, warranties,), time of purchase, returns, use of coupons, feedback, voting, reviews, or opinions, and so forth.

Additionally, profile 124 can include purchasing or transaction preferences such as a default shopping mode that, e.g. indicates a style or habits relating to purchase for customer 108. For example, the purchasing preferences can relate to how likely customer 108 is to spend extra time to ferret out bargains and/or responsiveness to promotions. Furthermore, the purchasing preferences can relate to how adverse customer 108 is to crowded shopping environments, or to particular policies or practices of certain vendors, etc. Naturally, other examples exist, but it should be appreciated that transaction or purchasing preferences can relate to many aspects of customer 108 and can be utilized in several ways. Furthermore, demographic data can also be included in profile 124 such as age, gender, income, as well as hobbies, interests, or viewpoints. As with purchasing preferences, some demographic data can be received as input directly from customer 108 or other suitable sources, or inferred from what is known or can be determined about customer 108.

As mentioned, permissions 122 can also be included in profile 124 and can be set in advance, set based upon a query-response, set based upon a default, based upon inferences about customer, based upon information included in entry 118, based upon information included in or inferred from profile 124, and so forth. Moreover, as introduced supra, permissions 122 for a particular entry 118 can be encapsulated in that entry 118 such as by way of authorization 214.

Figure 3:
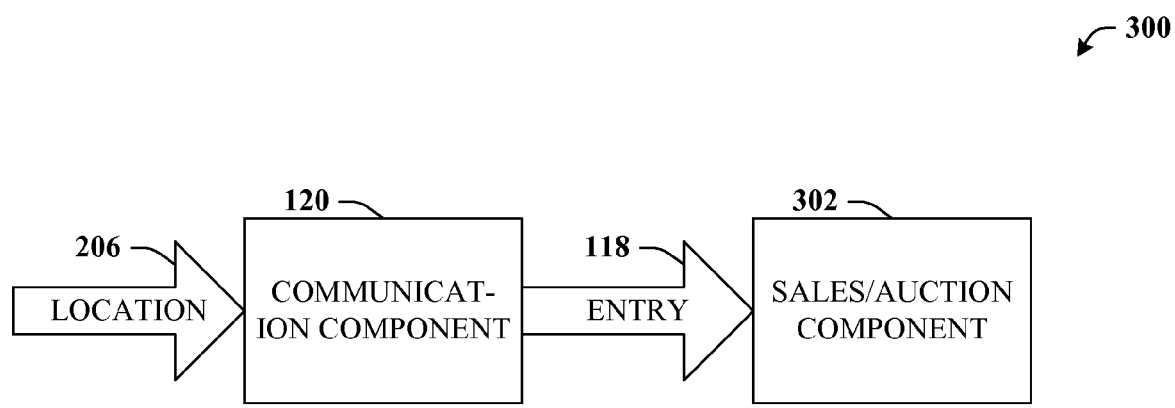
FIG. 3 depicts a block diagram of a system that can proliferate to another system or entity information relating to the property list 116.

Turning briefly to FIG. 3, a concrete illustration of the above is illustrated. FIG. 3 depicts system 300 that can proliferate to another system or entity information relating to the property list 116. In particular, system 300 illustrates communication 120 that can transmit entry 118 to a third party system or component 302 such as a used/pre-owned product sale, trade, charity, or auction website, a want ad publication, or substantially any outlet that can facilitate a transaction for, or the disposal of, item 110. One common example is an auction website, wherein upon receipt of entry 118, the auction website (e.g., sale component 302) can post item 110 for auctioning, soliciting bids, and conceivably automatically populate the auction post with other data included in entry 118 (e.g., description 202, media 204, price 208 . . . ).

It should be appreciated that permissions 122 can be employed to determine whether entry 118 should be transmitted. For instance, permissions 122 can stipulate that entry 118 should be transmitted only to a "community" outlet (e.g., authorization 214). Hence, public outlets might be filtered out, while local outlets, those who enforce membership conditions, those that are trusted, those in which customer 108 is a member, and so forth might not be filtered out. Thus, customer 108 can potentially tailor privacy concerns to his or her own thresholds and can conceivably regulate what data the public can access, what trusted groups or communities can access, or what no one other than customer 108 can access, and son on.

Furthermore, according to an aspect of the claimed subject matter, communication component 120 can transmit entry 118 to sale/auction component 302 based upon a location (e.g., location 206) of item 110 within environment 106. For instance, example entry 118 of FIG. 2 illustrates that the black leather sofa is located in an attic of customer 108. As such it might be reasonable to determine or infer that customer 108 is not making use of the sofa and would welcome disposing of the unused item. In such a case, entry 118 describing the black leather sofa can be automatically transmitted to sale component 302, whereas had location 206 indicated "living room" instead of attic, a contrary determination or inference might have been made. In addition, due to relatively large weight vis-à-vis shipping costs, the sofa might be limited to locality-based outlets or those that promote or favor face-to-face transactions and/or buyer pick-up, which can also be automatically determined or inferred based upon information included in entry 118 as well as other data sources.

Figure 4:
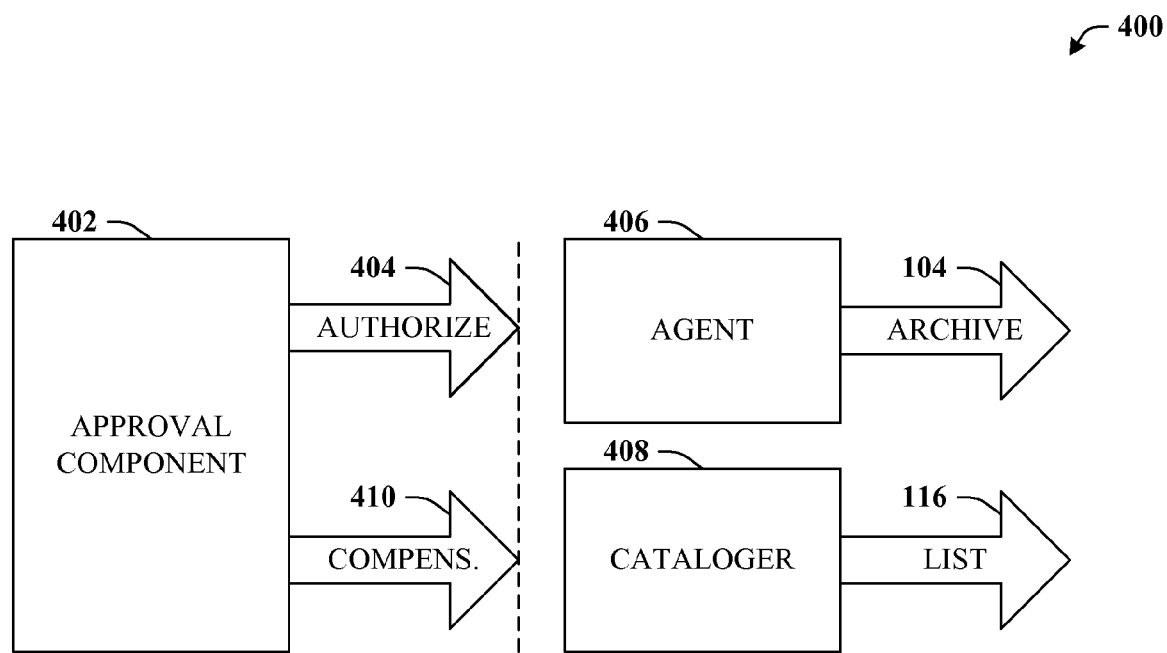
FIG. 4 illustrates a block diagram of a system that can facilitate authorizations in connection with received data.

Turning now to FIG. 4, system 400 that can facilitate authorizations in connection with received data is provided. In general, system 400 can include approval component 402 that can authorize 404 agent 406 to generate archive 104. In addition, approval component 402 can also authorize 402 cataloger 408 to generate property list 116, for example, by examination of archive 104. It should be appreciated that agent 406 and cataloger 408 can be skilled professionals, but might also be largely unskilled such as, e.g. customer 108, a friend or neighbor of customer 108, a human intelligence network, or the like, which is further detailed in connection with FIG. 5.

It should be further understood that agent 406 and cataloger 408 need not necessarily be independent entities.

Rather, both agent 406 and cataloger 408 can be the same individual or entity. Furthermore, it should be appreciated that at least cataloger 408 can be, or can be augmented or aided by, computer-based components. For example, machine-based learning, monitoring, or recognition techniques can be utilized for populating property list 116 rather than requiring a human actor in anything more than a supervisory role, as further described in connection with FIG. 5.

In another aspect approval component 402 can determine or infer appropriate compensation 410 to be paid to agent 406 in exchange for generating archive 104. For example, compensation 410 can be based upon, travel costs, the level of skill or reputation of agent 406, time involved, size of environment 106, guarantees or warranties such as quality or detail of archive 104, as well as numerous other factors. Similarly, approval component 402 can determine or infer compensation 410 to be paid to cataloger 408 in exchange for generating property list 116, potentially based upon considerations similar to those factors listed supra.

In accordance with what has been described herein, it is readily appreciable that the claimed subject matter can provide mechanisms by which customer 108 can conveniently and/or efficiently engage in vehicles or modes of exchange in order to optimize utility with respect to set $110_S$ as well as with respect to his own or her own unique conditions or interests. For example, by outsourcing and/or automating the tasks of archival and catalog of property, and by further automating efforts directed to posting item 110 to a suitable outlet, customer 108 need invest very little into such endeavors. However, a potential disincentive can arise given that compensation 410 expected by agent 406 or cataloger 408 might significantly impact the decision of customer 108 to employ the described subject matter. However, such a disincentive can be removed or mitigated to some degree, as outlined in connection with FIG. 5.

Figure 5:
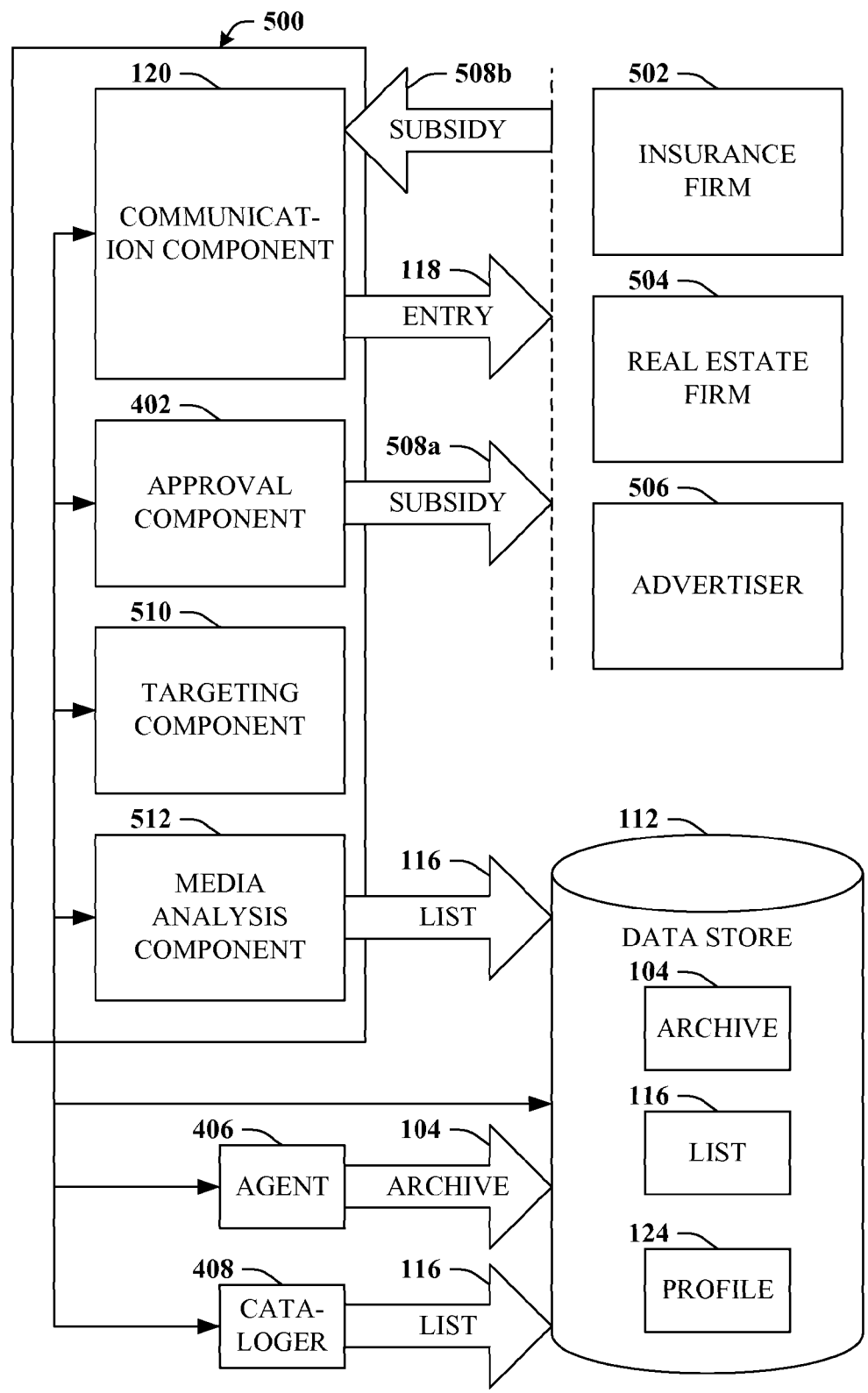
FIG. 5 is a block diagram of a system that can subsidize or diminish costs associated with expected compensation.

Referring now to FIG. 5, system 500 that can subsidize or diminish costs associated with expected compensation is depicted. Generally, system 500 can include communication component 120 that can transmit entry 118 for display based upon permission 122 set by customer 108 as well as based upon location 206 and other criteria. Further, system 500 can include approval component 402 that can authorize 404 agent 406 to generate archive 104 or authorize 402 cataloger 408 to generate property list 116. Approval component 402 can also determine compensation 410 to be paid to agent 406 or cataloger 408. In addition, even though not expressly illustrated, it should be understood that system 500 can also include other components referenced herein such as any or all of those described in connection with other figures.

According to another aspect of the claimed subject matter, approval component 402 can determine or infer subsidy 502*a* for compensation 410. In accordance therewith, the costs associated with compensation 410 that might normally be expected to be borne by customer 108 can be offset, removed, or potentially reversed to a provide profit or income to customer 108 based upon subsidizing mechanisms detailed further herein. As one example, communication component 120 can transmit entry 118 to a subsidizing entity in exchange for subsidy 502*b*.

It should be appreciated that subsidies 502*a* and 502*b* can be distinguished in that subsidy 502*a* is generally intended to represent aspects of data relating to a monetary subsidy (e.g. a monetary subsidy that will be provided to offset compensation 410) rather than the actual money or flow of money. For example, subsidy 502*a* illustrates that data relating to the proper or expected amount can be transmitted to a subsidizing entity instead of an indication that approval component 402 facilitates the transfer of that amount to the subsidizing entity. In contrast, subsidy 502*b* is typically intended to represent the actual transfer of such monetary value or an agreement to do so. In essence, when the subsidizing entity pays or agrees to pay subsidy 502*b* (the amount of which can be described by subsidy 502*a*), then communication component 120 can respond by transmitting entry 118.

As provided, a likely subsidizing entity can be insurance firm 504. Hence, it should be noted that communication component 120 can transmit archive 104 and/or property list 116 in its entirety rather than merely a single entry 118 from the list 116—in exchange for subsidy 502*b*. Access and/or receipt of such information can benefit insurance firm 504 in a number of ways, including providing a cost savings as the received information can be utilized by claim agents or adjusters and can preclude the necessity of gathering substantially similar information. In a converse situation, insurance firm 504 can be one or both of agent 406 or cataloger 408. For example, generating archive 104 and property list 116 can be a fundamental step for insurance firm 504 to execute internal controls and standard business practices. As this can incur labor costs to insurance firm 504, such can be mitigated by, e.g., transferring to or providing customer 108 access to the data relating to environment 106. Insurance firm 504 might be motivated by the associated goodwill from customer 108 providing such data will likely accrue and at no additional costs to insurance firm 504, or might charge a fee to subsidize their own business expenses. Regardless, once in possession and/or control of archive 104, property list 116, and/or entry 118, customer 108 can recoup any potential expenses as described herein.

Other example subsidizing entities can be real estate firm 506 or advertiser 508. In the former two cases (e.g., insurance firm 504 and real estate firm 508), evaluation of property value for contents (e.g. set $110_S$) might be most significant, however, in the last case (e.g., advertiser 508), it should be appreciated that other consideration can be more important. For example, regardless of a worth of a particular item 110, the mere presence of that item 110 can be significant to advertiser 508. For instance, consider a bag of dog food or a fish aquarium captured by archive 104 and embodied by entry 118. A local pet store, for example, might be very interested in discovering such information, as the pet store can be especially well-suited to provide goods or services in connection with dogs, etc., and could aptly tailor relevant ads and/or incentives to customer 108. Of course, many other examples exist, but it would be impossible to describe each and every conceivable benefit provided.

While presence of item 110 can be a relevant consideration for advertiser 508, additionally or alternatively, so too can a lack of item 110 from set $110_S$. For example, generally in the case in which advertiser 508 is privy to property list 116 rather than merely entry 118, environment 106 that lacks a coffee maker or a television in the master bedroom can be of significant interest to an electronics vendor. Of course, the lack of item 110 can also be determined by advertiser 508 by entry 118 alone, even without access to the entire property list 116. For instance, if entry 118 relates to a CRT (cathode-ray tube) computer monitor or to an item 110 that is outdated or in poor repair or condition, such can reasonably imply the environment lacks a newer or better substitute product such as an LCD (liquid crystal display) computer monitor.

Appreciably, not every advertiser 508 who desires such need receive entry 118 (or list 116). Rather, customer 108 can control or manage the transmission of data to substantially any level of specificity. In accordance therewith, system 500 can further include targeting component 510 that can examine at least one of archive 104 or list 116 to determine suitable advertiser 508. Such a determination can be based upon permissions 122 as well as other sources of information such as that included in data store 112 such as profile 124 associated with customer 108.

In addition, the suitable advertiser 508 can be determined based upon the contents of set $110_S$. In particular, upon examining archive 114 or property list 116, targeting component 510 can make an initial determination of a beneficial product to customer 108, and then make a second determination as to the suitable advertiser 508. For example, the beneficial product can be determined based upon that which is lacking from set $110_S$ and/or is outdated or in poor repair (e.g., condition 210) and potentially reasonably priced or currently on sale or discounted, as introduced supra.

In addition, in another aspect of the claimed subject matter, system 500 can include media analysis component 512 that can examine archive 104 in order to automatically construct property list 116, which can be stored to data store 112 as depicted and/or transmitted to inventory component 114 (not shown). Media analysis component 512 can employ well-known product recognition techniques as well as any other suitable recognition techniques, which is further detailed in connection with FIG. 6.

In addition, media analysis component 512 can employ machine learning techniques to construct property list 116, wherein the learning techniques can include receiving input from cataloger 408 or observing cataloger 408. For example, consider a portion of archive 104 that relates to a library or study. Media analysis component 512 can include or load specialization modules such as one devoted to identifying books by their spine or cover and/or access a database or a portion of data store 112 that includes, e.g. a repository of known books, books in print, book cover images or data, and so on. Generally, utilizing the specialized modules or data sets will be enough for identifying all books in the library, however, for rare, old, or obscure books, for example, a human actor can provide certain input, thereby facilitating a larger, broader, or smarter data set. Such can effectively allow media analysis component 512 to learn over time based upon observation of or input from, say a human actor.

In another aspect of the claimed subject matter, media analysis component 512 can employ a human intelligence network to construct property list 116. In particular, aspects relating to cataloging archive 104 can be outsourced to a network or community of participants (e.g., human actors, entities, or components) for identification. For example, the human intelligence network can be a system for or a service devoted to mechanical turking, where the system or service relies at least partially upon the prescience or skill set of human actors. Appreciably, customer 108 might choose to, e.g. pay the human intelligence network, say, a $100 fee (which can potentially be subsidized) to catalog items 104 is a garage, realizing that potential profits from the eventual sale of many of those items 104 can be much greater than the fee.

Figure 6:
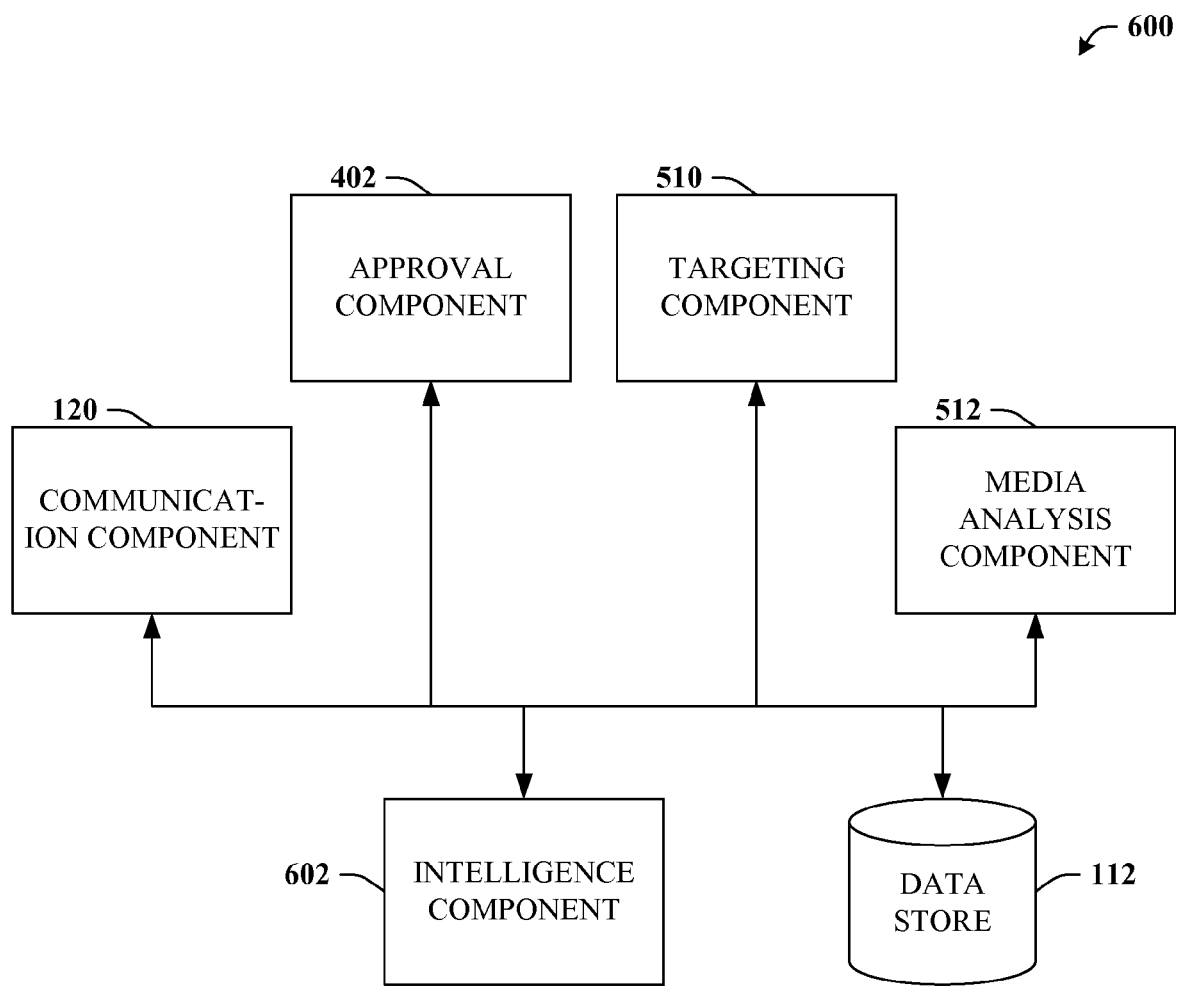
FIG. 6 depicts a block diagram of a system that can aid with various inferences.

With reference now to FIG. 6, system 600 that can aid with various determinations or inferences is depicted. Typically, system 600 can include communication component 120, approval component 402, targeting component 510, or media analysis component 512, which in addition to or in connection with what has been described supra, can also make various inferences or intelligent determinations. For example, communication component 120 can employ machine learning techniques to or inferences to intelligently determine when and to whom to transmit the entry, which can be done not only in connection with permissions 122 and location as described supra, but also by employing other data sets described herein such as profile 124 (e.g., transaction histories, demographics . . . ).

Likewise, approval component 402 can also employ machine learning techniques or inferences to intelligently determine compensation 410 or subsidy 502a based upon disparate data sets such as vendor catalogs, consumer and/or regional pricing indexes, blue books, discounting algorithms, etc. all of which can be stored to data store 112. As with communication component 120, targeting component 510 can learn or infer optimization techniques for selecting suitable advertiser 508 (e.g., from multiple advertisers) as well as selecting a beneficial product based upon condition 210 as well as features of profile 124 (e.g., demographics, purchasing preferences . . . ) potentially aggregating multiple profiles (e.g., from many other customers, or many similar customers) to ascertain likely habits or behavioral or purchase patterns. Similarly, media analysis component 512 can also employ learning techniques or inferences related to translating archive 104 to property list 116. For example, media analysis component 512 can utilize familiar product recognition techniques as well as character recognition techniques (e.g., OCR), potentially utilizing as well as building incrementally specialized dictionaries, grammars, or rules especially suited or adapted for products recognition as well particular items 110 or classes of items 110, which can also be facilitated in connection with vendor catalogs and the like.

In addition, system 600 can also include intelligence component 602 that can provide for or aid in various inferences or determinations. It is to be appreciated that intelligence component 602 can be operatively coupled to all or some of the aforementioned components. Additionally or alternatively, all or portions of intelligence component 602 can be included in one or more of the components 120, 402, 510, 512. Moreover, intelligence component 602 will typically have access to all or portions of data sets described herein, such as data store 112, and can furthermore utilize previously determined or inferred data.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
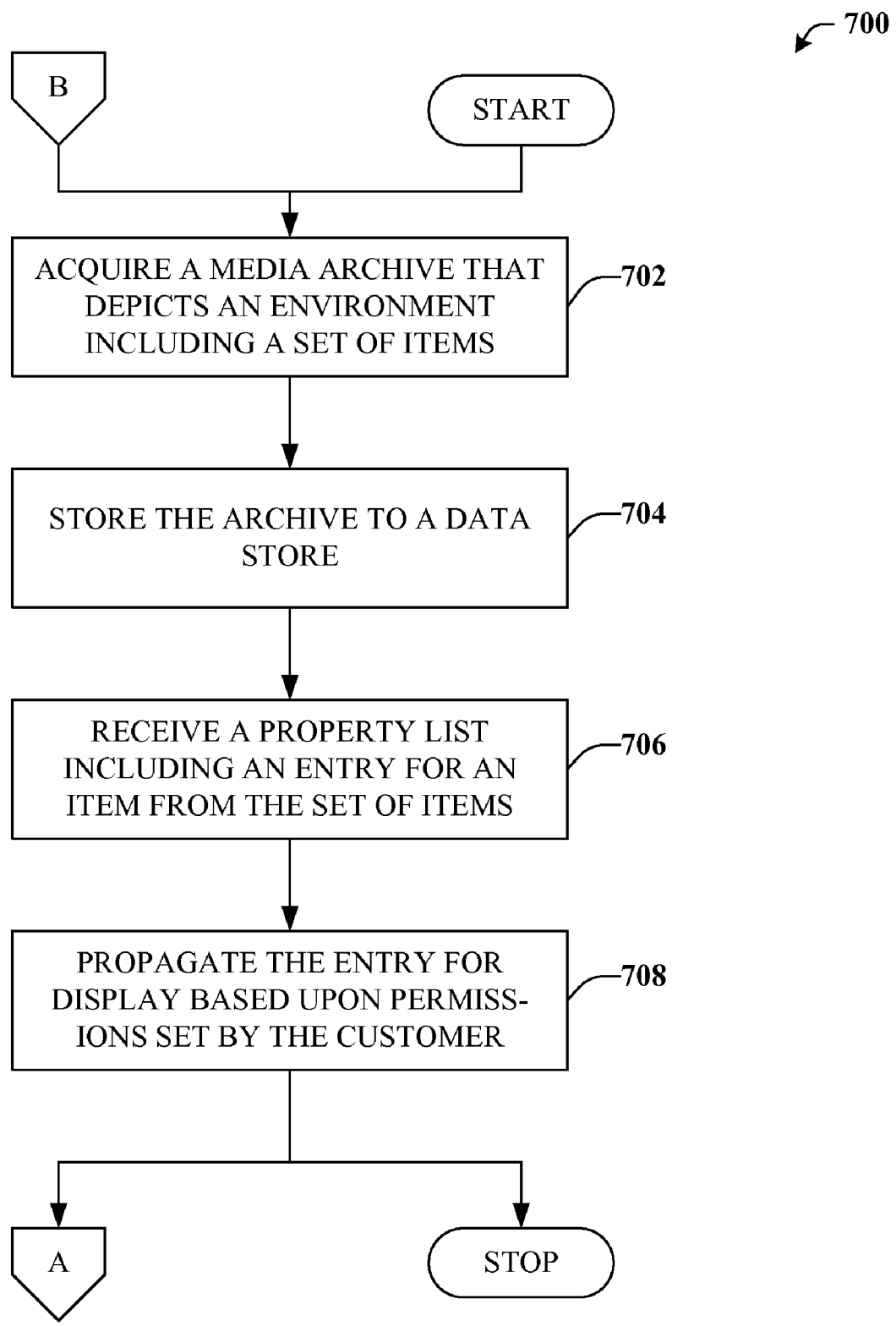
FIG. 7 is an exemplary flow chart of procedures that define a method for facilitating auditing of customer possessions in a comprehensive manner.
Figure 8:
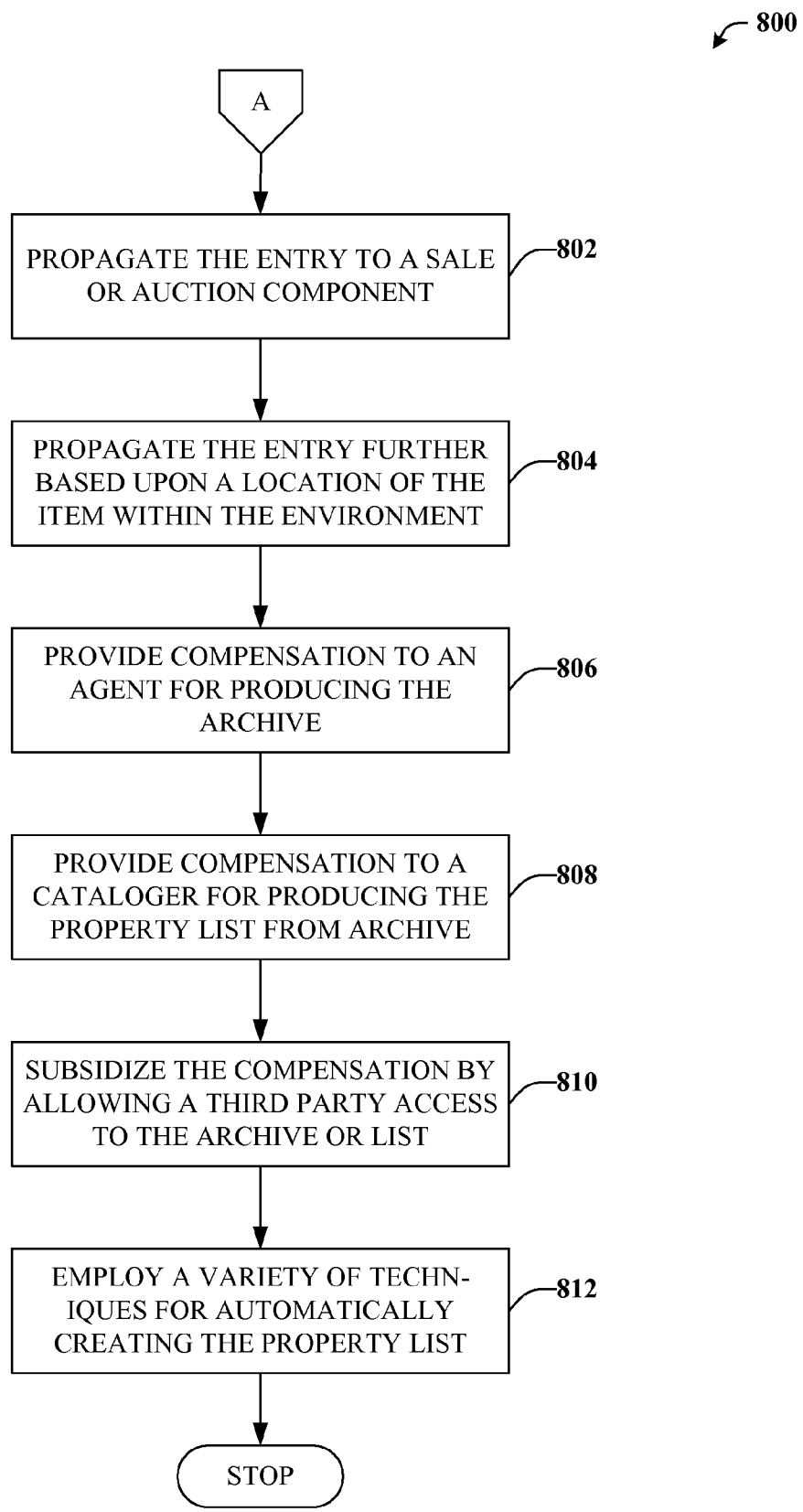
FIG. 8 illustrates an exemplary flow chart of procedures that define a method for providing additional features in connection with auditing of customer possessions.
Figure 9:
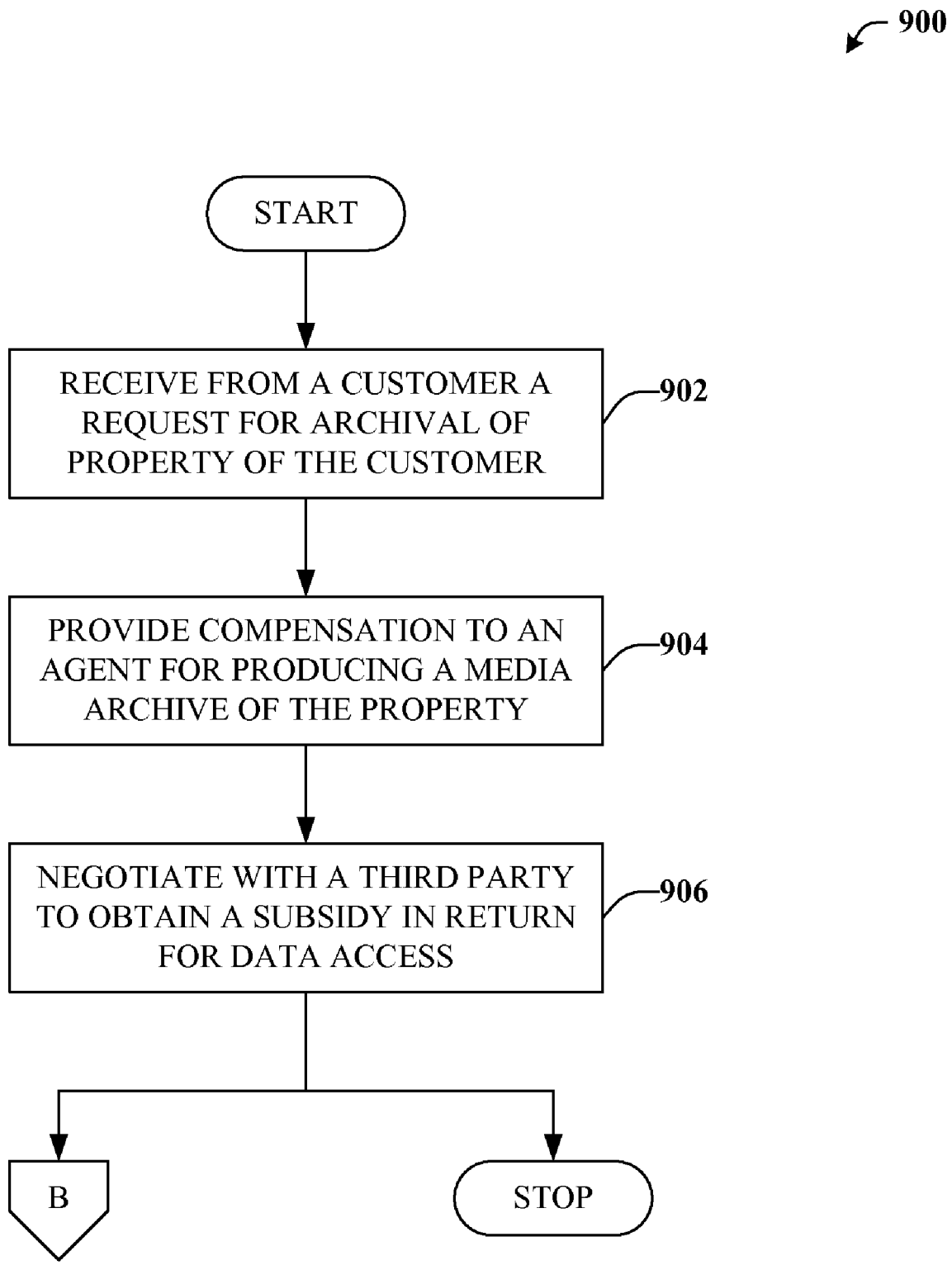
FIG. 9 depicts an exemplary flow chart of procedures defining a method for facilitating archival of customer possessions in a comprehensive manner.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 7, exemplary method 700 for facilitating auditing of customer possessions in a comprehensive manner is illustrated. Generally, at reference numeral 702, a media archive that depicts an environment of a customer from multiple views can be acquired. The archive can include a set of personal property items as well as real property, and at reference numeral 704, the archive can be stored to a data store. It should be appreciated that the archive can be comprised of one or more images as well as a video.

At reference numeral 706, a property list including an entry for an item from the set of personal property items can be received. The entry is typically formatted as a computer readable data structure including information relating to the item. As with the media archive, the property list and/or the entry can be saved to the data store.

At reference numeral 708, the entry can be propagated for display based upon permission set by the customer. For example, it can be determined or inferred which entities should be provided the entry based upon a variety of factors, criteria, and/or conditions, with an overriding adherence to the permissions.

Referring to FIG. 8, exemplary method 800 for providing additional features in connection with auditing of customer possessions is depicted. For example, at reference numeral 802, the entry received at act 706 and propagated at act 708 can be propagated to a sale, trade, charity/donation, or auction outlet. In particular, the entry can be delivered to, e.g., an auction webpage and automatically listed at the auction website based upon information included in the entry. Accordingly, the customer can exchange or dispose the entry in a manner that is potentially efficient and convenient and not necessarily proportional to number of items to be disposed of or exchanged.

Continuing on to reference numeral 804, the entry can be further propagated based upon a location of the item within the environment. For example, an entry that describes an item located in a closet can be more likely to be chosen for delivery to the sale or auction website than an entry for the same item that is more readily available (e.g., not stowed away).

At reference numeral 806, compensation can be provided to an agent for producing the archive. For instance, the customer can hire the agent, often a skilled or professional third party, to visit and photograph and/or film the environment. It should be noted however that the customer can conceivably produce the archive on his own or her own time. Similarly, at reference numeral 808, compensation can be provided to a cataloger for producing the property list from the source media archive produced at act 806. As before, the customer can potentially produce the property list, in which case no form of compensation need be provided other than to note that in such a case the customer's labor can be considered the compensation (e.g., in connection with a subsidy for compensation detailed infra). However, generally, the customer will outsource the production of the property list, often to a skilled professional.

Moving to reference numeral 810, the compensation can be subsidized, e.g. by allowing a subsidizing entity access to the archive or the property list. The subsidizing entity can be at least one of an insurance firm, a real estate firm, or an advertiser. In effect, the cost to the customer, either in terms of the compensation paid to the agent/cataloger or the time or other expenses invested by the customer, can be offset by allowing the entity to gain access to information included in the entry and/or the archive or property list. Appreciably, the customer can conceivably receive numerous subsidies, e.g. one from each of several subsidizing entities. Thus, the subsidy in the aggregate can provide a net profit to customer over the compensation costs.

At reference numeral 812, the property list can be constructed by examining the archive and employing at least one of product recognition techniques, a product data store, a human intelligence network or either direct or observed input from the cataloger. As can be readily appreciated, this act can provide the customer with additional options with regard to producing the property list. In particular, not only can this be performed by the customer or outsourced to another, but the property list can also be machine automated. Appreciably, the machine automation can be augmented by human input or by monitoring human behavior to expand the features or vocabulary of future actions. Additionally or alternatively, this can be achieved by farming out identification, classification, or cataloging to a community of human participants.

With reference now to FIG. 9, method 900 for facilitating archival of customer possessions in a comprehensive manner is illustrated. Generally, at reference numeral 902, a request for archival of property belonging to a customer can be received from the customer. For example, the customer can contact a host (e.g., one who provides services related to the claimed subject matter), provide suitably personal data to the host, and then sign up for related services by sending a request.

At reference numeral 904, compensation can be provided to an agent for producing a media archive of the property, generally in the form of a monetary transaction. Then, at reference numeral 906, a subsidy to offset the compensation provided at act 904 can be negotiated with a third party (e.g., a subsidizing entity such as an insurance agency, a real estate broker, an advertiser, or the like) in return for access to at least one of the media archive or a property list derived from the media archive.

Figure 10:
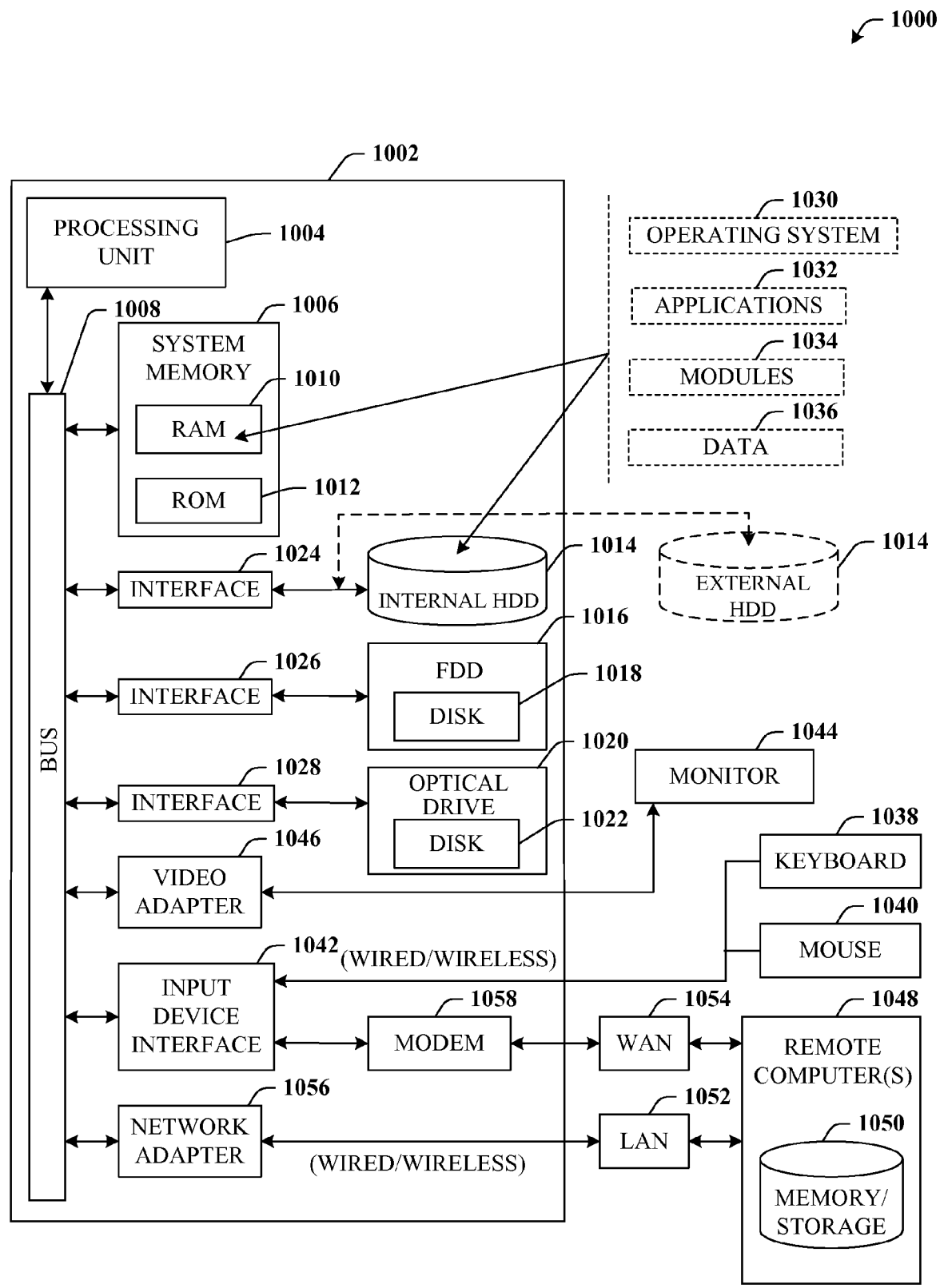
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g. the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 10 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 11:
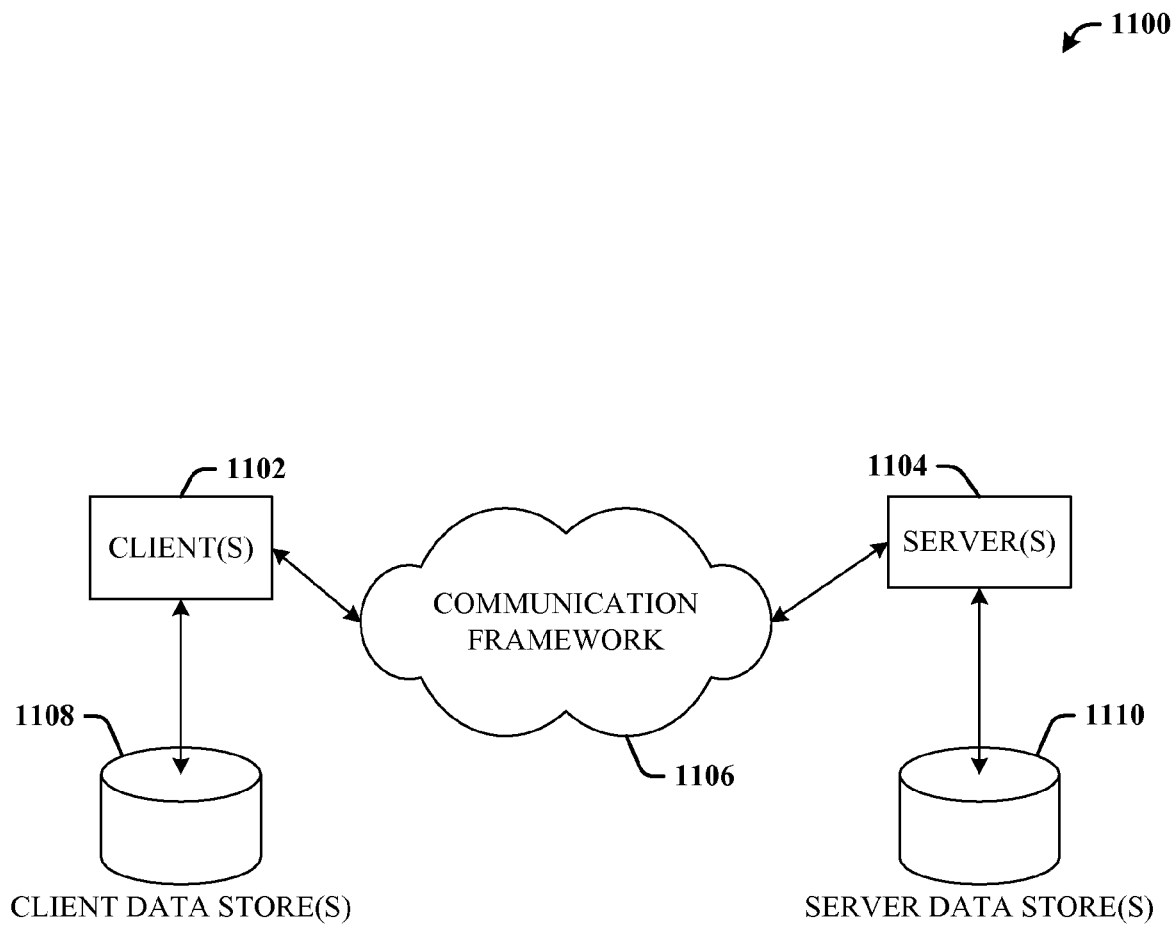
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer system that facilitates comprehensive auditing of a customer's possessions, the computer system comprising:

a processor coupled to a computer storage medium;
the computer storage medium that stores thereon a plurality of computer software components executable by the processor;
a media component that receives and stores a media archive, the archive depicts an environment of a customer from multiple views and includes video or images of a set of personal property items belonging to the customer;
a media analysis software component that employs machine learning techniques to construct a property list;
an inventory software component that receives the property list, the property list including an entry for an item from the set of personal property items; and
a communication software component that automatically tags and transmits the entry to a sale software component for display based upon a particular location of the item within the environment of the customer and permissions set by the customer.

2. The computer system of claim 1, wherein the archive includes one or more images or a video, and the environment is at least one of a residence, a garage, an attic, a storages shed, or a warehouse.

3. The computer system of claim 1, wherein the entry includes at least one of a description of the item, one or more images of the item, or a video of the item.

4. The computer system of claim 1, wherein the entry includes a location of the item within the environment.

5. The computer system of claim 1, wherein the entry includes at least one price for the item.

6. The computer system of claim 1, wherein the property list includes real property.

7. The computer system of claim 1, wherein the communication component transmits the entry to a sale or auction component of the computer system.

8. The computer system of claim 1, wherein the communication component transmits the entry to a sale or auction component of the computer system based upon a location of the item within the environment.

9. The computer system of claim 1, wherein the approval component further authorizes an agent to generate the archive, or that authorizes a cataloger to generate the property list.

10. The computer system of claim 9, wherein the approval component determines a compensation to be paid to the agent in exchange for the archive, or determines a compensation to be paid to the cataloger in exchange for the property list.

11. The computer system of claim 10, wherein the communication component transmits the entry to an insurance firm in exchange for the subsidy.

12. The computer system of claim 10, wherein the approval component determines a subsidy for the compensation, and the communication component transmits the entry to a real estate firm in exchange for the subsidy.

13. The computer system of claim 1, further comprising a targeting component that examines at least one of the archive or the property list to determine a suitable advertiser, wherein the communication component transmits the entry to the suitable advertiser.

14. The computer system of claim 13, wherein the targeting component determines the suitable advertiser based upon a determination of a beneficial product that is beneficial to the customer, and wherein the beneficial product is determined based upon an absence of the beneficial product from the set of personal property items or a condition of the item.

15. The computer system of claim 1, further comprising a media analysis component that examines the archive and constructs the property list.

16. The computer system of claim 15, wherein the media analysis component employs machine learning techniques to construct the property list, and wherein the learning techniques include receiving input from a cataloger or observing a cataloger.

17. The computer system of claim 15, wherein the media analysis component employs a human intelligence network to construct the property list.

18. A method for facilitating auditing of customer possessions in a comprehensive manner, comprising:
acquiring, utilizing a computing device, a media archive that depicts an environment of a customer from multiple views, the archive including video or images of a set of personal property items belonging to the customer;
storing, in association with the computing device, the archive to a data store;
constructing, utilizing machine learning techniques, a property list including an entry for an item from the set of personal property items, the entry having a description of the item, location of the item, media of the item, permissions set by the customer, and profile information;
receiving, utilizing the computing device, the property list including the entry for an item of the set of personal property items; and
automatically tagging and propagating the entry, utilizing the computing device, to a sale software component for display based upon a particular location of the item within the environment of the customer and permissions set by the customer.

19. The method of claim 18, further comprising at least one of the following acts:
propagating the entry to a sale, trade, charity, or auction outlet;
propagating the entry further based upon a location of the item within the environment;
providing compensation to an agent for producing the archive;
providing compensation to a cataloger for producing the property list from the archive;
subsidizing the compensation by allowing at least one of an insurance firm, a real estate firm, or an advertiser access to the archive or the property list; or
constructing the property list by examining the archive and employing at least one of product recognition techniques, a product data store, a human intelligence network, or direct or observed input from the cataloger.

20. One or more computer-readable storage media not being a signal per se having computer executable instructions embodied thereon that, when executed, perform a method for facilitating archival of customer possessions in a comprehensive manner, the method comprising:
receiving from a customer a request for archival of property of the customer;
receiving and storing a media archive that depicts an environment of a customer from multiple views, the archive including video or images of a set of personal property items belonging to the customer;
creating, utilizing machine learning techniques, a property list having an entry for an item from the set of personal property items, the entry including a description of the item, location of the item, media of the item, permissions set by the customer, and profile information; and
automatically tagging and transmitting the entry, to a sale software component for presenting the entry based upon a particular location of the item within the environment of the customer and permissions set by the customer.

* * * * *